United States Patent
Xie et al.

(10) Patent No.: US 11,223,050 B2
(45) Date of Patent: Jan. 11, 2022

(54) SPLICED LITHIUM STRIP, PREPARATION METHOD THEREOF, AND RELATED NEGATIVE ELECTRODE PLATE, BATTERY CORE, LITHIUM ION BATTERY, BATTERY MODULE, BATTERY PACK AND APPARATUS

(71) Applicant: Contemporary Amperex Technology Co., Limited, Ningde (CN)

(72) Inventors: Bin Xie, Ningde (CN); Shitong Chen, Ningde (CN); Zhijie Gong, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

(21) Appl. No.: 17/345,134

(22) Filed: Jun. 11, 2021

(65) Prior Publication Data
US 2021/0313585 A1    Oct. 7, 2021

Related U.S. Application Data

(63) Continuation of application No. PCT/CN2020/103483, filed on Jul. 22, 2020.

(30) Foreign Application Priority Data

Aug. 2, 2019 (CN) .......................... 201910712143.8

(51) Int. Cl.
| | | |
|---|---|---|
| *H01M 4/66* | (2006.01) | |
| *H01M 4/75* | (2006.01) | |
| *H01M 10/0525* | (2010.01) | |

(52) U.S. Cl.
CPC ............. *H01M 4/661* (2013.01); *H01M 4/75* (2013.01); *H01M 10/0525* (2013.01)

(58) Field of Classification Search
CPC .... H01M 4/661; H01M 4/75; H01M 10/0525; H01M 2004/021; H01M 2004/027; H01M 4/382; Y02E 60/10; B21D 39/03
(Continued)

(56) References Cited

U.S. PATENT DOCUMENTS

2020/0277465 A1* 9/2020 Kondo ................ H01M 50/417

FOREIGN PATENT DOCUMENTS

| CN | 105810452 A | 7/2016 |
|---|---|---|
| CN | 206379422 U | 8/2017 |

(Continued)

OTHER PUBLICATIONS

International Search Report for PCT Application No. PCT/CN2020/103483,dated Oct. 30, 2020, 13 pages.

*Primary Examiner* — Gary D Harris
(74) *Attorney, Agent, or Firm* — Law Offices of Liaoteng Wang

(57) ABSTRACT

The present application provide a spliced lithium strip, preparation method thereof, and related negative electrode plate, battery core, lithium ion battery, battery module, battery pack and apparatus. The spliced lithium strip is formed by splicing two or more base lithium strips, wherein the base lithium strip has a thickness fluctuation of less than 5%; the spliced lithium strip has a spliced area and a non-spliced area alternately distributed along the splicing direction, and the spliced area has a maximum thickness H and the non-spliced area has a minimum thickness L, satisfying $$\frac{|H-L|}{L} \times 100\% \leq 6\%.$$

18 Claims, 3 Drawing Sheets

(58) Field of Classification Search
USPC .......................................................... 429/209
See application file for complete search history.

(56) References Cited

FOREIGN PATENT DOCUMENTS

| | | |
|---|---|---|
| CN | 109728306 A | 5/2019 |
| CN | 109817472 A | 5/2019 |
| CN | 210467983 U | 5/2020 |
| JP | H1186847 A | 3/1999 |

* cited by examiner

SPLICED LITHIUM STRIP, PREPARATION METHOD THEREOF, AND RELATED NEGATIVE ELECTRODE PLATE, BATTERY CORE, LITHIUM ION BATTERY, BATTERY MODULE, BATTERY PACK AND APPARATUS

CROSS-REFERENCE TO RELATED APPLICATION

This application is a continuation of International Application No. PCT/CN2020/103483, filed on Jul. 22, 2020, which claims priority to Chinese Patent Application No. 201910712143.8 filed on Aug. 2, 2019, both of which are incorporated herein by reference in its entirety.

TECHNICAL FIELD

This application belongs to the technical field of energy storage apparatus, and specifically relates to a spliced lithium strip, preparation method thereof, and related negative electrode plate, battery core, lithium ion battery, battery module, battery pack and apparatus.

BACKGROUND

With the popularity of new energy vehicles, people have higher for the range of power batteries. At the same time, consumer electronic products such as mobile phones are becoming more and more popular and diversified. An important experience for users is the usage time after a single charge. Therefore, the demand for secondary batteries having high energy density is increasingly keen.

Increasing the width of an electrode can increase the capacity of the battery core. In order to obtain a higher energy density, the anode (also known as the negative electrode) can be prelithiated. There are many pre-lithiation methods, and one of the anode pre-lithiation schemes uses metallic lithium strip. For example, a lithium foil for pre-lithiating is obtained by rolling a metallic lithium strip, and the lithium foil is in contact with or laminated with the negative electrode layer, and then the negative active material is prelithiated by the metallic lithium foil under the action of the potential difference. However, the currently commonly used lithium strips have a small width, which cannot well meet the requirements for pre-lithiation of wide electrodes. Therefore, there is an urgent need to develop a wide-width lithium strip to meet the needs of the market.

SUMMARY

The inventors found that if the width of the metallic lithium strip is directly increased, that is to say, a wide-width lithium strip is prepared by a one-time molding method, the thickness uniformity of the wide-width lithium strip in the transverse direction (TD) is poor. Such a lithium strip is prone to accumulation of lithium strips in the production process of lithium foil for prelithiating, which is not conducive to continuous production, and seriously affects production efficiency and yield. At the same time, when the obtained lithium foil is used for prelithiating the negative electrode, it will lead to uniform pre-lithiation of the negative electrode and in turn affects the cycle performance of the battery.

The inventors have conducted a lot of research and cleverly discovered that a wide-width lithium strip with good thickness uniformity can be obtained by splicing two or more narrow-width lithium strips as the base lithium strip.

Therefore, a first aspect of the present application provides a spliced lithium strip formed by splicing two or more base lithium strips, wherein the base lithium strip has a thickness fluctuation of less than 5%;

the spliced lithium strip has a spliced area and a non-spliced area alternately distributed along the splicing direction, and the spliced area has a maximum thickness H and the non-spliced area has a minimum thickness L, satisfying $$\frac{|H-L|}{L} \times 100\% \leq 6\%.$$

Surprisingly, it is found that the present application adopts the method of splicing base lithium strips, and controls the thickness fluctuation of the base lithium strips and the thickness relationship between the spliced area and the non-spliced area within a specific range. The obtained spliced lithium strip can simultaneously have large width and good thickness uniformity. The spliced lithium strip can be used to prepare a larger-width prelithiated negative electrode plate, and the negative electrode plate can obtain higher pre-lithiation uniformity. Therefore, the lithium ion battery adopting the negative electrode plate can simultaneously obtain higher energy density and cycle performance.

In any of the foregoing embodiments of the first aspect of the present application, the spliced area comprises a body region and a transition region, and the transition region of each spliced area is adjacent to the non-spliced area, and each body region has a width of 0.1 mm to 3.5 mm, optionally 1 mm to 3 mm. A suitable width of each body area can make the spliced lithium strip have better thickness uniformity, and also have higher splicing strength and mechanical properties.

In any of the foregoing embodiments of the first aspect of the present application, the spliced area comprises two protrusions opposite to each other along the thickness direction of the spliced lithium strip, and the two protrusions respectively protrude from the two surfaces of the non-spliced area in the thickness direction, and each of the protrusions in the thickness direction has a cross section in trapezoidal or trapezoid-like shape, and each trapezoid or trapezoid shape has a lower bottom angle of 0.02 degree or less, optionally $2\times10^{-3}$ degree or less, or $1\times10^{-4}$ degree to $2\times10^{-3}$ degrees. A suitable lower bottom angle can further improve the thickness uniformity of the spliced lithium strip.

In any of the foregoing embodiments of the first aspect of the present application, the thickness fluctuation of the base lithium strip is 3% or less, optionally 2.5% or less. The smaller the thickness fluctuation of the base lithium strip is, the better the thickness uniformity of the spliced lithium strip obtained after splicing will be.

In any of the foregoing embodiments of the first aspect of the present application, the maximum thickness H of the spliced area and the minimum thickness L of the non-spliced area satisfy $$\frac{|H-L|}{L} \times 100\% \leq 5\%.$$

The smaller the thickness deviation between the spliced area and the non-spliced area of the spliced lithium strip is, the better the overall thickness uniformity of the spliced lithium strip is.

In any of the foregoing embodiments of the first aspect of the present application, the width of the base lithium strip is 170 mm or less, optionally 80 mm to 160 mm, or 80 mm to 130 mm. A suitable width of the base lithium strip can result in a spliced lithium strip with better thickness uniformity. In particular, the spliced lithium strip has a larger width while achieving better thickness uniformity.

In any of the foregoing embodiments of the first aspect of the present application, the thickness of the base lithium strip is from 0.2 mm to 4 mm, optionally 0.5 mm to 3 mm, or 1 mm to 2 mm. A suitable thickness of the base lithium strip can make the thickness uniformity of the spliced lithium strip better, while also having a smaller thickness.

In any of the foregoing embodiments of the first aspect of the present application, the base lithium strip has a Mohs hardness of 0.6 to 2.5, optionally 0.6 to 2.0, 0.6 to 1.5, or 0.6 to 1.0. The Mohs hardness of the base lithium strip is within the above range, which can further improve the thickness uniformity of the spliced lithium strip and increase the splicing strength of the spliced lithium strip.

In any of the foregoing embodiments of the first aspect of the present application, the spliced lithium strip is formed by splicing two or more base lithium strip in the width direction of each other, and a spliced area and a non-spliced area are alternately distributed in the width direction of the spliced lithium strip. The overall thickness uniformity of such spliced lithium strips is relatively high.

In any of the foregoing embodiments of the first aspect of the present application, relative to a side edge in the width direction of the spliced lithium strip itself, the position of the body region in the width direction fluctuates within 1 mm. The overall thickness uniformity of such a spliced lithium strip is further improved.

A second aspect of the present application provides a method for preparing a spliced lithium strip, including:
  providing two or more base lithium strips, each of which has a thickness fluctuation of less than 5%;
  splicing the two or more base lithium strips one by one, so that the edges of two adjacent base lithium strips are overlapped on each other, and pressing together to obtain the spliced lithium strip;
  wherein the spliced lithium strip has a spliced area and a non-spliced areas alternately distributed along the splicing direction, and the spliced area has a maximum thickness H and the non-spliced area has a minimum thickness L, satisfying $$\frac{|H-L|}{L} \times 100\% \leq 6\%$$

The improved preparation method of the present application adopts the method of splicing base lithium strip, and controls the thickness fluctuation of the base lithium strip and the thickness relationship between the spliced area and the non-spliced area within a specific range. The obtained spliced lithium strip can simultaneously have a larger width and good thickness uniformity. The spliced lithium strip can be used to prepare a larger-width prelithiated negative electrode plate, and the negative electrode plate can obtain higher pre-lithiation uniformity. Therefore, the lithium ion battery adopting the negative electrode plate can simultaneously obtain higher energy density and cycle performance.

In any of the foregoing embodiments of the second aspect of the present application, the two or more base lithium strips are sequentially spliced along their own width direction, and edges of the two adjacent base lithium strips are overlapped with each other in a width of 0.1 mm to 3.5 mm; before the pressing together, the method further includes correcting the deviation of the two or more spliced base lithium strips, taking the outer edge of the outermost base lithium strip as a reference, the stacked area where the edges of the two adjacent base lithium strips are overlapped with each other has a position fluctuation in the width direction within 1 mm.

A third aspect of the present application provides a negative electrode plate, including: a negative electrode current collector; a negative active material layer disposed on the negative electrode current collector; a lithium-based metal layer disposed on the negative active material layer, wherein the lithium-based metal layer is formed by laminating the spliced lithium strip according to the first aspect of the present application or the spliced lithium strip obtained by the preparation method according to the second aspect of the present application on the surface of the negative active material layer.

Since the negative electrode plate of the present application adopts the spliced lithium strip described in the present application, it can have a larger width and a higher pre-lithiation uniformity.

The fourth aspect of the present application provides a battery core, including the negative electrode plate according to the third aspect of the present application.

Since the battery core of the present application adopts the negative electrode plate described in the present application, it can have higher energy density and cycle performance.

A fifth aspect of the present application provides a lithium ion battery, including a battery core and an electrolyte, wherein the battery core adopts the battery core according to the fourth aspect of the present application.

Since the lithium ion battery of the present application adopts the battery of the present application, it can have a higher energy density and cycle performance.

A sixth aspect of the present application provides a battery module, including the lithium ion battery according to the fifth aspect of the present application.

A seventh aspect of the present application provides a battery pack including the battery module according to the sixth aspect of the present application.

An eighth aspect of the present application provides an apparatus, including at least one of the lithium ion battery according to the fifth aspect of the present application, the battery module according to the sixth aspect of the present application, or the battery pack according to the seventh aspect of the present application.

The battery module, battery pack, and apparatus of the present application include the lithium-ion battery described in the present application, and therefore have at least the same or similar technical effects as the lithium ion battery.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

Figure 1:
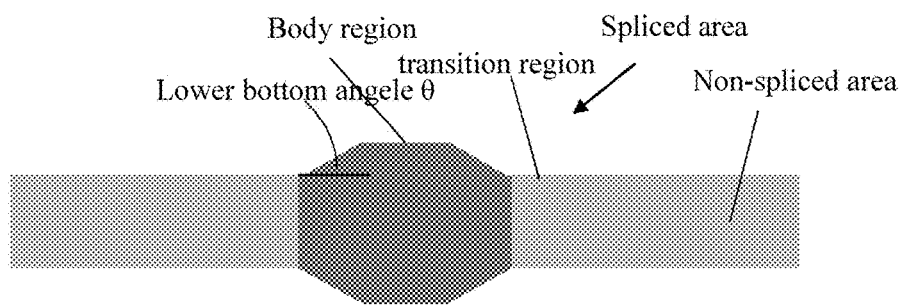
FIG. 1 is a schematic cross-sectional view of a spliced area of a spliced lithium strip according to an embodiment of the application.

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

A first aspect of embodiments of the present application provides a spliced lithium strip formed by splicing two or more base lithium strips, wherein the base lithium strip has a thickness fluctuation of less than 5%; the spliced lithium strip has a spliced area and a non-spliced area alternately distributed along the splicing direction, and the spliced area has a maximum thickness H and the non-spliced area has a minimum thickness L, satisfying $$\frac{|H-L|}{L} \times 100\% \leq 6\%.$$

Surprisingly, the inventors have found that by using the method of splicing the base lithium strips, and controlling the thickness fluctuation of the base lithium strips and the thickness relationship between the spliced area and the non-spliced area within a specific rang, a spliced lithium strip combining a large width and good thickness uniformity can be obtained.

In the present application, the maximum thickness of splicing base lithium strip in the transverse direction (TD) is recorded as $L_1$; the minimum thickness of the base lithium strip in the TD is recorded as $L_2$; the design thickness of the base lithium strip (i.e., the thickness specification of the base lithium strip) is recorded as $L_0$, then the thickness fluctuation A of the based lithium strip=$(L_1-L_2)/L_0 \times 100\%$, and A satisfies A≤5%.

The maximum thickness and minimum thickness of the base lithium strip can be determined by using instruments and methods known in the art. For example, using a micrometer or a high accuracy micrometer, etc. The thickness of the base lithium strip is measured at a preset interval from one edge in the width direction (i.e., TD, the transverse direction) of the base lithium strip to the opposite side edge. Those skilled in the art can select the preset distance according to the requirements of test accuracy. The preset distance is, for example, 1 mm to 30 mm, such as 5 mm to 20 mm. The maximum value among the multiple thickness values measured can be recorded as $L_1$, and the minimum value can be recorded as $L_2$.

The spliced lithium strip of the present application is formed by splicing two or more base lithium strips. Specifically, the edges of two adjacent base lithium strips are laminated with each other, and the resulting spliced lithium strip comprises a spliced area and a non-spliced area along the splicing direction. The thickness fluctuation of the base lithium strip is less than 5%, which can make the non-spliced area of the spliced lithium strip have higher thickness uniformity, and can make the thickness fluctuation of the spliced area of the spliced lithium strip smaller.

In the present application, the maximum dimension of the spliced area in the thickness direction of the spliced lithium strip is the maximum thickness H of the spliced area. The minimum dimension of the non-spliced area in the thickness direction of the spliced lithium strip is the thickness L of the non-spliced area. The relationship between the maximum thickness H of the spliced area and the minimum thickness L of the non-spliced area is recorded as B=|H−L|/L×100%. That is to say, B can represent the thickness deviation between the spliced area and the non-spliced area of the spliced lithium strip, and at the same time, B also reflects the thickness uniformity of the spliced lithium strip. B 6%, so that the thickness of the spliced area has less influence on the fluctuation of the overall thickness of the spliced lithium strip, and the thickness uniformity of the spliced lithium strip is significantly improved.

The value of B can be measured using instruments and methods well known in the art. For example, using a micrometer or a high accuracy micrometer, etc. The thickness of the spliced lithium strip is measured at preset intervals from one side edge in the width direction (i.e. the transverse direction (TD)) of the spliced lithium strip to the opposite side edge. Those skilled in the art can select the preset distance according to the requirements of test accuracy. The preset distance is, for example, 1 mm to 30 mm, such as 5 mm to 20 mm. The measured multiple thickness values include multiple thickness values in the spliced area and multiple thickness values in the non-spliced area. Among them, the multiple thickness values of the splicing area include multiple thickness values of the body region (see the description below for details). The maximum value among the multiple thickness values of the body region of the spliced area is recorded as H, and the minimum value among the multiple thickness values of the non-spliced area is recorded as L.

Under the conditions that A≤5% and B≤6%, the overall thickness of the spliced lithium strip has good uniformity.

In some alternative embodiments, the thickness fluctuation A of the base lithium strips satisfies A≤3%, for example, A≤2.5%, A≤2.0%, A≤1.7%, A≤1.5%, A≤1.3%, A≤1.1%, or A≤1.0%, etc. The thickness fluctuation of the base lithium strips is small, and the thickness uniformity of the spliced lithium trip obtained after splicing is better.

In some optional embodiments, the thickness of the base lithium strip is 4 mm or less. A suitable thickness of the base lithium strip can make the thickness uniformity of the spliced lithium strip better, while also having a smaller thickness. This can better meet the application requirements of pre-lithiation of the negative electrode in the battery.

Optionally, the thickness of the base lithium strip may be 10 μm or more, 100 μm or more, 200 μm or more, 300 μm or more, 500 μm or more, 800 μm or more, 1 mm or more, or 1.2 mm or more. Optionally, the thickness of the base lithium strip may be 4 mm or less, 3.5 mm or less, 3 mm or less, 2.5 mm or less, 2 mm or less, or 1.5 mm or less. For example, the thickness of the base lithium strip is from 0.2 mm to 4 mm, from 0.5 mm to 3 mm, or from 1 mm to 2 mm.

In some optional embodiments, the width of the base lithium strip is 170 mm or less. The width of the base lithium strip affects its own thickness uniformity, which in turn affects the thickness uniformity of the spliced lithium strip. A suitable width of the base lithium strip can obtain better thickness uniformity, so as to obtain a spliced lithium strip with better thickness uniformity.

Optionally, the width of the base lithium strip is 160 mm or less. The use of such base lithium strip can make the spliced lithium strip have better thickness uniformity. Further optionally, the width of the base lithium strip may be 150 mm or less, 140 mm or less, 130 mm or less, 120 mm or less, 110 mm or less, or 100 mm or less.

In order to obtain a wider spliced lithium strip, a base lithium strip having a suitable larger width can be used. In this way, the number of base lithium strips that need to be spliced is small, i.e., the number of spliced areas is small, which can reduce the influence of the thickness deviation of the spliced area on the thickness uniformity of the entire spliced lithium strip. As a result, the obtained spliced lithium strip has a larger width and better thickness uniformity. That is to say, the overall thickness fluctuation of the spliced lithium strip is smaller. Optionally, the width of the base lithium strip may be 10 mm or more, 30 mm or more, 50 mm or more, 60 mm or more, 70 mm or more, 80 mm or more, or 90 mm or more.

In some optional embodiments, the width of the base lithium strip is from 80 mm to 160 mm, for example, from 80 mm to 130 mm, or from 80 mm to 100 mm, etc. The base lithium trip can make the spliced lithium strip obtain better thickness uniformity.

In some optional embodiments, the base lithium strip has a Mohs hardness of 0.6 to 2.5. When the Mohs hardness of the base lithium strip is from 0.6 to 2.5, the flowability of the metal is better during the pressing (such as rolling) process, which is convenient for the pressing operation, and the splicing strength is high. In particular, the Mohs hardness of the base lithium strip is from 0.6 to 2.5, and the flow uniformity of the metal during the pressing (such as rolling) process is better, which can further improve the thickness uniformity of the spliced lithium strip.

Optionally, the Mohs hardness of the base lithium strip is from 0.6 to 2.0, from 0.6 to 1.5 or from 0.6 to 1.0, etc.

In some alternative embodiments, the base lithium strip may be a metallic lithium strip or a lithium alloy strip. The lithium alloy strip is based on metallic lithium and added with modifying elements. In this way, the Mohs hardness of the base lithium strip can be adjusted. For example, the modifying element can be one or more selected from Al, Mg, Na, K, Ca, Si, Pb, Fe, Ni, and Cu.

Optionally, the metallic lithium is present in an amount of 80% or more by mass in the lithium alloy strip, for example, 90% or more by mass. The lithium alloy strip has a relatively high content of metallic lithium. When it is used for the pre-lithiation of the negative electrode, the effect of the pre-lithiation of the negative electrode can be improved, which is beneficial to increase the energy density of the battery.

The Mohs hardness of the base lithium strip can be measured with instruments and methods known in the art, for example, a Mohs hardness tester.

In some optional embodiments, the maximum thickness H of the spliced area and the minimum thickness L of the non-spliced area satisfy B≤5%. The smaller the thickness deviation between the spliced area and the non-spliced area of the spliced lithium strip is, the better the overall thickness uniformity of the spliced lithium strip will be, for example, B≤4.5%, ≤4.0%, ≤3.5%, ≤3.0%, ≤2.7%, ≤2.5%, ≤2.3%, ≤2.0%, or ≤1.7%, etc.

The spliced lithium strip of the present application comprises a spliced area and a non-spliced area. Specifically, the edges of two adjacent base lithium strips are laminated with each other, and they are stacked into a whole by lamination. Among them, under the pressure of lamination, the thickness of the laminated area is reduced, and the metal in the laminated area also flows to the other edge of the two base lithium strips opposite to the laminated edge, so that each spliced area of the finally formed spliced lithium strip comprises a body region and a transition region located on both sides of the main region. The transition region of each spliced area is adjacent to the non-spliced area. Specifically, the side of the transition region away from the body area is the non-splice area. Referring to FIG. 1, the thickness of the non-spliced area is basically the same; the thickness of the body region of the spliced area is basically the same, and the thickness of the transition region shows a descending thickness gradient from the body region to the non-spliced area.

The smaller the splicing width of two adjacent base lithium strips is, the smaller the influence of the thickness deviation of the spliced area on the thickness uniformity of the spliced lithium strip is. In the spliced lithium strip of the present application, the width of the body region is substantially equal to the stacking width of the edges of two adjacent base lithium strip before lamination. Therefore, the splicing width can be reflected by the width of the body region. When the width of each body region is less than 3.5 mm, a spliced lithium strip with high thickness uniformity can be obtained.

In some embodiments, the width of each body region may be ≤3.5 mm, ≤3 mm, ≤2.8 mm, ≤52.5 mm, ≤2 mm, ≤1.8 mm, or ≤1.5 mm. The width of each body area may be ≥0.1 mm, ≥0.3 mm, ≥0.5 mm, ≥0.7 mm, ≥0.9 mm, ≥1.0 mm, or ≥1.1 mm.

Optionally, the width of each body region is from 0.1 mm to 3.5 mm, for example, 1 mm~3 mm, or 1 mm~2 mm, etc. A suitable width of each body region can make the spliced lithium strip have better thickness uniformity, and also have higher splicing strength and mechanical properties.

In some embodiments, the spliced area comprises two protrusions opposite to each other in the thickness direction of the spliced lithium strip. The two protrusions respectively protrude from the two surfaces of the non-spliced area in the thickness direction of the spliced lithium strip. That is to say, one of the protrusions protrudes from the surface on one side of the non-spliced area in the thickness direction of the spliced lithium strip, and the other protrusion protrudes from the other side of the non-spliced area opposite to the aforementioned side surface.

The cross-section of each protrusion in the thickness direction of the spliced lithium strip is in a trapezoidal or trapezoid-like shape. The area corresponding to the upper bottom of the trapezoid or trapezoid trapezoid-like shape is the body region of the spliced area, and the areas corresponding to the waists on both sides of the trapezoid or trapezoid-like shape are the transition regions of the spliced area, respectively. In some optional embodiments, the lower bottom angle θ of the trapezoid or trapezoid-like shape is 0.02 degree or less, for example, $2\times10^{-3}$ degree or less, $1\times10^{-4}$ degree to $2\times10^{-3}$ degree, or $1\times10^{-4}$ degree to $9\times10^{-4}$ degree, etc.

Under the condition that the cross-sectional angle θ of the spliced area is appropriate, the transverse thickness change of the spliced area has less influence on the thickness uniformity of the spliced lithium strip, which can further improve the thickness uniformity of the spliced lithium strip.

The lower bottom angle θ of the spliced area can be measured with instruments and methods known in the art. For example, the following method can be used to determine the lower bottom angle θ: taking a sample of the spliced lithium strip, and cutting the sample to obtain its cross section; measuring the dimension of the transition region in the width direction of the spliced lithium strip, recorded as $l_1$, and measuring the dimension of the protrusion in the thickness direction of the spliced lithium strip, recorded as $l_2$; then θ is calculated according to the following formula:

$$\theta = \arctan\left(\frac{l_2}{l_1}\right).$$

In some embodiments, the base lithium strip is a long strip, and the base lithium strip is spliced along the width direction of the spliced lithium strip. That is to say, the spliced lithium strip is formed by splicing two or more base lithium strip in the width direction of each other, and the spliced area and the non-spliced area are alternately distributed in the width direction of the spliced lithium strip. The overall thickness uniformity of such spliced lithium strip is relatively high.

In some embodiments, the position of the body region in the width direction fluctuates within 1 mm, with reference to the side edges in the width direction of the spliced lithium strip itself.

The position fluctuation of the spliced area in the width direction can be tested by the following methods, including: measuring the distance between one edge of the body region with the edge of a spliced lithium strip on the same side or the opposite side by a size measuring tool (such as a soft ruler, etc., with a test accuracy of 0.1 mm); measuring the distance between the edges of the strip at intervals of 0.2 m~0.5 m in the length direction of the spliced lithium strip (the test interval can be adjusted by those skilled in the art according to requirements); the difference between the maximum value and the minimum value among the multiple values obtained by the test is less than or equal to 1 mm. Since the brightness of the body region after lamination is greater than that of other regions, the edges of the body region can be easily distinguished.

The position of the body region fluctuates within 1 mm. That is to say, the spliced area is basically an area aligned with the length of the spliced lithium strip. The overall thickness uniformity of such spliced lithium strip is further improved.

When the Mohs hardness of the base lithium strip is from 0.6 to 2.5, such as from 0.6 to 2.0, from 0.6 to 1.5, or from 0.6 to 1.0, it is also suitable for making the lower bottom angle θ of the spliced area meet the aforementioned requirements. In addition, when the Mohs hardness of the base lithium strip is from 0.6 to 2.5, such as from 0.6 to 2.0, from 0.6 to 1.5, or from 0.6 to 1.0, it is also beneficial to making the position of the body region of the splicing area fluctuate within 1 mm.

It is understandable that, in the spliced lithium strip of the present application, the shape of the base lithium strip and the splicing direction are not particularly limited. The base lithium strip can be any shape, such as triangle, quadrilateral, pentagon, irregular polygon, etc. The splicing direction of the base lithium strip may be along the width direction or the length direction of the spliced lithium strip, or the splicing direction of the base lithium strip may be any other direction.

The embodiment of the second aspect of the present application provides a method for preparing a spliced lithium strip, by which any of the above-mentioned spliced lithium strips can be obtained. A method for preparing a spliced lithium strip of the present application includes the following steps:

S10: providing two or more base lithium strips, each of which has a thickness fluctuation of less than 5%.

In step S10, the base lithium strip may be a metallic lithium strip or a lithium alloy strip. The lithium alloy strip can be the lithium alloy strip described above.

In step S10, optionally, the thickness fluctuation of the base lithium strip is 3% or less, or 2.5% or less.

In step S10, optionally, the width of the base lithium strip is from 80 mm to 160 mm, from 80 mm to 130 mm, or from 80 mm to 100 mm, etc.

In step S10, optionally, the Mohs hardness of the base lithium strip is from 0.6 to 2.5, from 0.6 to 2.0, from 0.6 to 1.5, or from 0.6 to 1.0, etc.

In step S10, optionally, the thickness of the base lithium strip is from 0.2 mm to 4 mm, from 0.5 mm to 3 mm, or from 1 mm to 2 mm, etc.

In the present application, the base lithium strip is commercially available, or can be prepared by methods known in the art. As an example of the preparation method of the basic lithium strip, a first substrate, a lithium sheet to be rolled, and a second substrate can be stacked in sequence, and rolled by a rolling device, so that the three layers are laminated together; then the second substrate is peeled off. In the laminated structure, the two sides of the lithium sheet to be rolled are completely covered by the first substrate and the second substrate, respectively.

The first substrate may be a polymer film, a metal film or an inorganic material film. For example, the first substrate may be one or more of Teflon, polyethylene, polypropylene, polyurethane, polytetrafluoroethylene, polyarylsulfone, polyethylene terephthalate, acrylonitrile-butadiene-styrene copolymer, polyimide and polyethersulfone.

The second substrate may be a polymer film, a metal film or an inorganic material film. For example, the second substrate may be one or more of Teflon, polyethylene, polypropylene, polyurethane, polytetrafluoroethylene, polyarylsulfone, polyethylene terephthalate, acrylonitrile-butadiene-styrene copolymer, polyimide and polyethersulfone.

In the process of rolling the laminated structure of the first substrate, the lithium sheet to be rolled, and the second substrate by the rolling device, the heating temperature of the work roll is from 35° C. to 120° C. The rolling pressure can be 0.2 MPa 1.5 MPa. The speed of the work roll can be 0.001 m/min~60 m/min. The gap between the work rolls can be greater than 0 mm and less than or equal to 5 mm.

S20: splicing the two or more base lithium strips sequentially, so that the edges of two adjacent base lithium strips are overlapped with each other, and the spliced lithium strip is obtained by pressing.

In step S20, two or more base lithium strips are spliced sequentially, wherein the edges of every two adjacent base lithium strips are overlapped with each other, and the width of the stack may be 3.5 mm or less, for example, 0.1 mm~3 mm, 1 mm~3 mm, 0.1 mm 2 mm, 0.1 mm~1 mm, or 1 mm~2 mm, etc. Multiple spliced base lithium strips are pressed together so that the stack of every two adjacent base lithium strips are laminated with each other as a whole.

In step S20, the pressing can be performed by using devices and methods known in the art, such as a rolling device. The pressing temperature can be normal temperature, such as 20° C.~30° C., or 20° C.~25° C. The lamination pressure can be adjusted according to the material and thickness of the base lithium strip. For example, in some embodiments, the lamination pressure may be from 0.9 ton to 2 ton, such as 1 ton to 1.5 ton. Among them, 1 ton pressure is equivalent to a pressure of 9.8 KN.

In some embodiments, in step S20, two or more base lithium strips may be sequentially spliced along their own width direction.

In some embodiments, step S20 includes:

S210: Splicing two or more base lithium strips in order along their own width direction, so that the edges of two adjacent base lithium strips are overlapped with each other and the overlapping width is 3.5 mm or less, such as 0.1 mm~3 mm, 1 mm 3 mm, 0.1 mm~2 mm, 0.1 mm~1 mm, or 1 mm~2 mm, etc.

S220: Rectifying the deviation of two or more base lithium strips after splicing, taking the outer edge of the outermost base lithium strip as a reference, the position of the overlapped area where the edges of two adjacent base lithium strips are stacked on each other fluctuates within 1 mm in the width direction.

The position fluctuation in the width direction of the overlapped area where the edges of two adjacent base lithium strips are stacked on each other can be measured by the following method, including: measuring the distance between one side edge of the overlapped area of two adjacent base lithium strips and the outer edge of the outermost base lithium strip with size tools (such as a soft ruler, CCD image sensor, etc., with a test accuracy of 0.1 mm, for example) at intervals of 0.2 m~0.5 m in the length direction of the base lithium strip (those skilled in the art can adjust the test interval according to requirements) as a value; the difference between the maximum value and the minimum value of the multiple values obtained by the test is less than or equal to 1 mm. The outermost base lithium trip may be the outermost base lithium strip on the same side or a different side from the said side edge of the overlapped area. The outer edge of the outermost base lithium strip corresponds to the outer edge of the spliced lithium strip.

The position of the overlapped area of two adjacent base lithium strips fluctuates within 1 mm in the width direction, which is beneficial to making the spliced lithium strip take the side edge in the width direction of itself as the reference, and the position of the body region in the width direction fluctuates within 1 mm, so that the obtained spliced lithium strip has a better overall thickness uniformity.

In step S220, the deviation correction can be performed using a deviation correction sensor or the like.

S230: Rolling two or more base lithium strips after splicing to obtain a spliced lithium strip.

In step S230, the rolling can be performed using a device and method known in the art, such as a rolling device. The rolling temperature can be normal temperature, such as 20° C.~30° C., or 20° C.~25° C. The rolling pressure can be 0.9 ton~2 ton, such as 1 ton~1.5 ton.

In the preparation method of the present application, after the base lithium strips are spliced and pressed together, a spliced lithium strip with larger width and good thickness uniformity can be obtained. The preparation method has high operability, can improve production efficiency and reduce production costs. In addition, by adopting the preparation method of the present application to prepare a wide-width lithium strip with good thickness uniformity, a higher production yield can also be obtained. Therefore, the present application not only improves the thickness uniformity of the wide-width lithium strip, but also solves the problems of extremely low production yield and high production cost when directly processing a metal lithium strip with a larger width in the prior art.

Other technical features in the embodiments of the first aspect of the present application can also be applied to the embodiments of the second aspect of the present application, and will not be repeated here.

A third aspect of the present application provides a negative electrode plate, comprising a negative electrode current collector; a negative active material layer disposed on the negative electrode current collector, the negative active material layer comprising a negative active material; a lithium-based metal layer disposed on the negative active material, wherein the lithium-based metal layer is formed by laminating the spliced lithium strip described in the present application on the surface of the negative active material layer.

The negative electrode current collector has two opposite surfaces in the thickness direction thereof. The negative active material layer can be provided on either of the two surfaces, or can be respectively disposed on the two surfaces. The lithium-based metal layer is disposed on the surface of the negative active material layer facing away from the negative electrode current collector.

It should be noted that the negative electrode plate described in the third aspect of the present application is a negative electrode plate that has not been infiltrated by the electrolyte. And after the electrolyte is injected, there is a potential difference between the negative active material layer and the lithium-based metal layer, thus the negative active material layer can be spontaneously prelithiated by the lithium-based metal layer, and part or all of the metallic lithium of the lithium-based metal layer is pre-inserted into the negative active material to form the prelithiated negative active material.

Since the negative electrode plate of the present application adopts the spliced lithium strip described in the present application, it can have a larger width and a higher uniformity of pre-lithiation. Therefore, the lithium ion battery adopting the negative electrode plate can simultaneously obtain higher energy density and cycle performance.

In the negative electrode plate of the present application, the negative electrode current collector can be made of a material with good electrical conductivity and mechanical strength, such as a copper foil.

The negative electrode plate of the present application has no particular limitation on the type of negative active material, and the negative active materials known in the art can be used. As an example, the negative active material can be one or more selected from the group consisting of natural graphite, artificial graphite, soft carbon, hard carbon, mesocarbon microspheres, nano-carbon, elemental silicon, silicon-oxygen compound, silicon-carbon composite, silicon alloy, elemental tin, tin oxide compound, tin-carbon composite, tin alloy and lithium titanate.

In the negative electrode plate of the present application, the negative active material layer may optionally comprise a conductive agent, a binder, and a thicker, and there is no specific limitation on their types, and those skilled in the art can make selections according to actual needs. As an example, the conductive agent may be one or more selected from the group consisting of superconducting carbon, acetylene black, carbon black, Ketjen black, carbon dots, carbon nanotubes, graphene, and carbon nanofibers. The binder can be one or more selected from the group consisting of polyacrylic acid (PAA), sodium polyacrylate (PAAS), polyvinyl alcohol (PVA), styrene butadiene rubber (SBR), sodium alginate (SA), polymethacrylic acid (PMAA) and sodium carboxymethyl cellulose (CMC-Na).

The negative electrode plate can be prepared according to conventional methods in the art. For example, the negative active material and optional conductive agent, binder and thickener are dispersed in a solvent which can be deionized water to form a uniform negative electrode slurry. The negative electrode slurry is coated on a negative electrode current collector; after being dried, cold pressed and other processes, a negative active material layer is obtained; the spliced lithium strip described in the present application is laminated on the surface of the negative active material layer facing away from the negative electrode current collector to form a lithium-based metal layer, so as to obtain a negative electrode plate. The spliced lithium strip can be laminated onto the surface of the negative active material layer by means of roll pressing.

The fourth aspect of the present application provides a battery core, comprising any negative electrode plate of the present application. In some embodiments, the battery core is formed from a positive electrode plate, a negative electrode plate and a separator by a lamination process or a winding process, and the separator is located between the positive electrode plate and the negative electrode plate to play a role of isolation.

It should be noted that the battery core in the fourth aspect of the present application refers to a battery core that has not been infiltrated with electrolyte. In a narrow sense, the battery core of the present application may only comprise a positive electrode plate, a separator, and a negative electrode plate. The battery core of the present application may also include other structures in a broad sense, such as terminal components, protective shell components, and the like.

In the battery core of the present application, the positive electrode plate comprises a positive electrode current collector and a positive active material layer disposed on at least one surface of the positive electrode current collector, the positive active material layer comprising a positive active material.

In the battery core of the present application, the positive electrode current collector can be made of a material with good conductivity and mechanical strength, such as an aluminum foil.

The battery core of the present application does not specifically limit the types of positive electrode active materials, and positive electrode active materials known in the art can be used, and those skilled in the art can make selections according to actual needs. As an example, the positive active material may be selected from lithium transition metal oxides and modified materials thereof, and the modified material may be lithium transition metal oxide subjected to doping modification and/or coating modification. Optionally, the lithium transition metal oxide can be one or more selected from the group consisting of lithium cobalt oxide, lithium nickel oxide, lithium manganese oxide, lithium nickel manganese oxide, lithium nickel cobalt manganese oxide, and lithium nickel cobalt aluminum oxide.

In the battery core of the present application, the positive active material layer may further comprise an optional binder and/or an optional conductive agent. The types of the binder and the conductive agent are not specifically limited, and those skilled in the art can make selections according to actual needs. Optionally, the binder may be one or more selected from the group consisting of polyvinylidene fluoride (PVDF) and polytetrafluoroethylene (PTFE), vinylidene fluoride-tetrafluoroethylene-propylene terpolymer, vinylidene fluoride-hexafluoropropylene-tetrafluoroethylene terpolymers and tetrafluoroethylene-hexafluoropropylene copolymers. The conductive agent may be one or more selected from the group consisting of superconducting carbon, acetylene black, carbon black, Ketjen black, carbon dots, carbon nanotubes, graphene, and carbon nanofibers.

The above-mentioned positive electrode plate can be prepared according to conventional methods in the art. For example, the positive active material and optionally conductive agent and binder are dispersed in a solvent (such as N-methylpyrrolidone, or NMP for short), to form a uniform positive electrode slurry, and the positive electrode slurry is coated on the positive electrode collector. After being dried, cold pressed and other processes, the positive electrode plate is obtained.

The battery core of the present application has no particular limitation on the type of the separator, and any well-known porous structure separator having good chemical and mechanical stability can be selected, such as one or more of glass fiber membrane, non-woven membrane, polyethylene film, polypropylene film, polyvinylidene fluoride film, and their multilayer composite film.

The fifth aspect of the present application provides a lithium ion battery, comprising a battery core and an electrolyte, wherein the battery core adopts any one or several battery cores of the present application.

Since the lithium ion battery of the present application uses the battery core of the present application, it can have both higher energy density and cycle performance.

In the lithium ion battery of the present application, the electrolyte is infiltrated in the battery core, and the positive electrode plate and the negative electrode plate play a role of conducting ions. The electrolyte (i.e. an electrolytic solution) comprises an electrolyte lithium salt and a solvent.

Optionally, the electrolyte lithium salt is one or more selected from the group consisting of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate), and LiTFOP (lithium tetrafluorooxalate phosphate).

Optionally, the solvent is one or more selected from the group consisting of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

The electrolytic solution may optionally comprise additives. The additive is not particularly limited and can be selected according to requirements. For example, the additives may comprise negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

Figure 3:
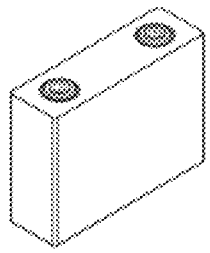
FIG. 3 is a perspective view of an embodiment of a lithium ion battery.

There is no particular limitation on the shape of the lithium ion battery of the present application, which may be cylindrical, square or other arbitrary shape. FIG. 3 shows a lithium ion battery 5 with a square structure as an example.

In some embodiments, the lithium ion battery may comprise an outer package for packaging the positive electrode plate, the negative electrode plate, the separator and the electrolyte.

Figure 4:
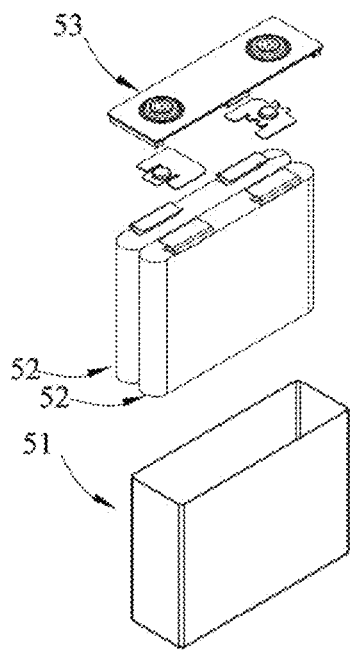
FIG. 4 is an exploded view of FIG. 3.

In some embodiments, referring to FIG. 4, the outer package may comprise a housing 51 and a cover plate 53. The housing 51 may comprise a bottom plate and side plates connected to the bottom plate, and the bottom plate and the side plates form a receiving cavity. The housing 51 has an opening communicated with the receiving cavity, and the cover plate 53 can cover the opening to close the receiving cavity.

The positive electrode plate, the negative electrode plate and the separator may be stacked or wound to form a battery core 52. The battery core 52 is packaged in the receiving cavity. The electrolyte infiltrates the electrode assembly 52. The lithium ion battery 5 may comprise one or several battery cores 52, which can be adjusted according to requirements.

In some embodiments, the outer package of the lithium ion battery may also be a hard case, such as a hard plastic case, an aluminum case, or a steel case. The outer package of the lithium ion battery may be a soft bag, such as a pouch type soft bag. The material of the soft bag may be plastic, such as one or more of polypropylene (PP), polybutylene terephthalate (PBT), and polybutylene succinate (PBS).

In some embodiments, the lithium ion battery can be assembled into a battery module. The battery module may comprise a plurality of lithium ion batteries, and the specific number can be adjusted according to the application and capacity of the battery module.

Figure 5:
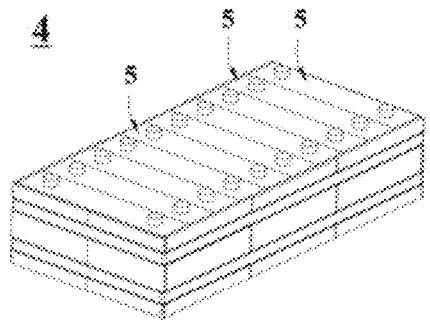
FIG. 5 is a perspective view of an embodiment of a battery module.

FIG. 5 shows a battery module 4 as an example. Referring to FIG. 5, in the battery module 4, a plurality of lithium ion batteries 5 may be disposed sequentially in the length direction of the battery module 4. Of course, the lithium ion batteries 5 may also be disposed in any other manner. Furthermore, the plurality of lithium ion batteries 5 may be fixed by fasteners.

Optionally, the battery module 4 may further comprise a housing with a receiving space, and the plurality of lithium ion batteries 5 are received in the receiving space.

In some embodiments, the above-mentioned battery module may also be assembled into a battery pack, and the number of battery modules contained in the battery pack can be adjusted according to the application and capacity of the battery pack.

Figure 6:
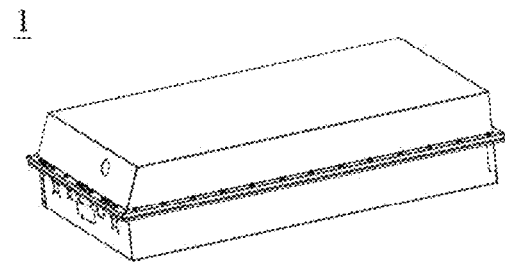
FIG. 6 is a perspective view of an embodiment of a battery pack.
Figure 7:
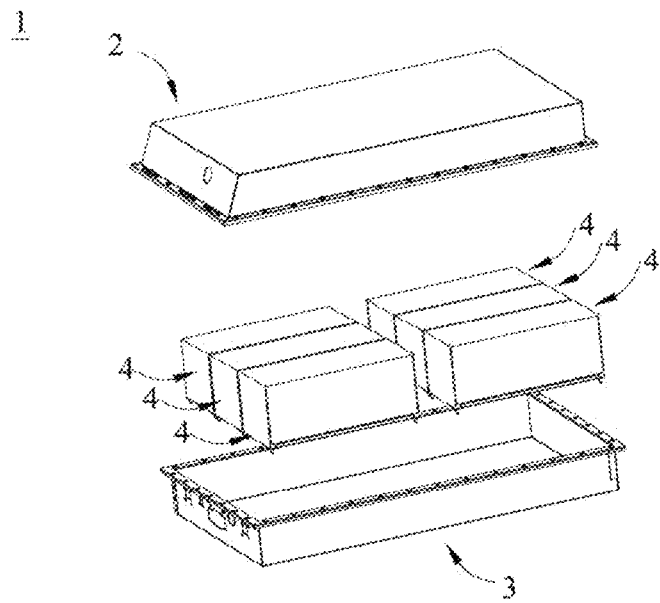
FIG. 7 is an exploded view of FIG. 6.

FIGS. 6 and 7 show a battery pack 1 as an example. Referring to FIGS. 6 and 7, the battery pack 1 may comprise a battery box and a plurality of battery modules 4 disposed in the battery case. The battery box comprises an upper box body 2 and a lower box body 3. The upper box body 2 can cover the lower box body 3 to form a closed space for receiving the battery modules 4. A plurality of battery modules 4 can be disposed in the battery box in any manner.

The present application further provides an apparatus, comprising the lithium ion battery, the battery module or the battery pack according to present application. The lithium ion battery, the battery module or the battery pack can be used as a power supply of the apparatus, and can also be used as an energy storage unit of the apparatus. The apparatus may be, but is not limited to, a mobile apparatus (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may comprise the lithium ion battery, the battery module or the battery pack selected according to its usage requirements.

Figure 8:
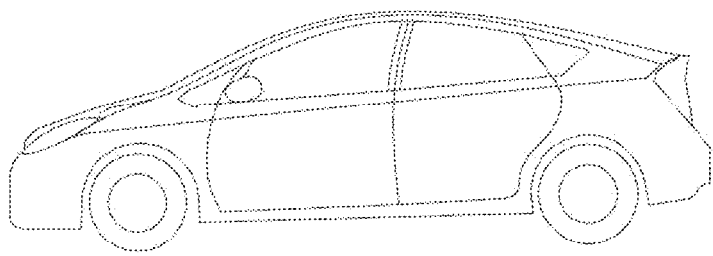
FIG. 8 is a schematic view showing an embodiment of an apparatus using a lithium ion battery as a powder source.

FIG. 8 shows an apparatus as an example. The apparatus is a pure electric vehicle, a hybrid electric vehicle, or a plug-in hybrid electric vehicle. In order to meet the requirements of the apparatus for high power and high energy density of lithium ion batteries, the battery pack or battery module can be used.

As another example, the apparatus may be a mobile phone, a tablet computer, a notebook computer, etc. The apparatus is generally required to be thin and light, and the lithium ion battery can be used as a power supply.

EXAMPLES

In order to describe the technical contents, structural features, achieved objectives and effects of the technical solutions in detail, the following detailed descriptions will be given in conjunction with specific embodiments. It should be understood that these embodiments are only used for explaining the present application, rather than limiting the scope of the present application. Unless otherwise stated, all parts, percentages, and ratios described in the following embodiments are based on weight, all reagents used in the embodiments are commercially available or synthesized according to conventional methods and can be directly used without further treatment, and all instruments used in the embodiments are commercially available.

Example 1

A lithium strip (a lithium strip conforming to Li-2 in GB/T 20930-2015 "Lithium strip") is obtained by the roll forming method described above, and such lithium strip is used as the base lithium strip. The base lithium strip has a width of 80 mm, a design thickness of 2 mm and a thickness fluctuation A in the transverse direction (TD) of 1%.

The edges of two base lithium strips that were overlapped with each other had a overlapping width of 1 mm. After that, the two base lithium strips were combined into a spliced lithium strip with a width of 159 mm by rolling, and the rolling pressure of the rolling was 1.5 ton. The thickness fluctuation in the transverse direction (TD) of the non-spliced area of the spliced lithium strip was 1%, and the B value of the spliced lithium strip was 2%.

Example 2

Different from Example 1, the width of the base lithium strip was 100 mm, the thickness fluctuation in the transverse direction (TD) was 1.3%, and the other parameters were shown in Table 1.

Example 3

Different from Example 1, the width of the base lithium strip was 130 mm, the thickness fluctuation in the transverse direction (TD) was 1.5%, and the other parameters were shown in Table 1.

Example 4

Different from Example 1, the width of the base lithium strip was 140 mm, the thickness fluctuation in the transverse direction (TD) was 2.0%, and the other parameters were shown in Table 1.

Example 5

Different from Example 1, the width of the base lithium strip was 160 mm, the thickness fluctuation in the transverse direction (TD) was 3.0%, and the other parameters were shown in Table 1.

Example 6

Different from Example 1, the width of the base lithium strip was 170 mm, the thickness fluctuation in the transverse direction (TD) was 5.0%, and the other parameters were shown in Table 1.

Example 7

Different from Example 3, the Mohs hardness of the base lithium strip was 0.8, and the other parameters were shown in Table 1.

Example 8

Different from Example 3, the Mohs hardness of the base lithium strip was 1.0, and the other parameters were shown in Table 1.

Example 9

Different from Example 3, the Mohs hardness of the base lithium strip was 1.2, and the other parameters were shown in Table 1.

Example 10

Different from Example 3, the Mohs hardness of the base lithium strip was 2, and the other parameters were shown in Table 1.

Example 11

Different from Example 3, the Mohs hardness of the base lithium strip was 2.5, and the other parameters were shown in Table 1.

Example 12

Different from Example 3, the width of the overlapped edges of the two base lithium strip was 0.1 mm, and the remaining parameters are shown in Table 1.

Example 13

Different from Example 3, the width of the overlapped edges of the two base lithium strip was 2 mm, and the remaining parameters are shown in Table 1.

Example 14

Different from Example 3, the width of the overlapped edges of the two base lithium strip was 3 mm, and the remaining parameters are shown in Table 1.

Example 15

Different from Example 3, the width of the overlapped edges of the two base lithium strip was 3.5 mm, and the remaining parameters are shown in Table 1.

Example 16

Different from Example 3, the design thickness of the base lithium strip was 0.2 mm, the thickness fluctuation in the transverse direction (TD) was 3%, and the other parameters were shown in Table 1.

Example 17

Different from Example 3, the design thickness of the base lithium strip was 0.5 mm, the thickness fluctuation in the transverse direction (TD) was 2.5%, and the other parameters were shown in Table 1.

Example 18

Different from Example 3, the design thickness of the base lithium strip was 1 mm, the thickness fluctuation in the transverse direction (TD) was 1.7%, and the other parameters were shown in Table 1.

Example 19

Different from Example 3, the design thickness of the base lithium strip was 3 mm, the thickness fluctuation in the transverse direction (TD) was 1.3%, and the other parameters were shown in Table 1.

Example 20

Different from Example 3, the design thickness of the base lithium strip was 4 mm, the thickness fluctuation in the transverse direction (TD) was 1.1%, and the other parameters were shown in Table 1.

Example 21

Different from Example 3, the rolling pressure was 0.9 ton, and other parameters were shown in Table 1.

Comparative Example 1

A lithium sheet was rolled directly to form a wide lithium strip with a width of 259 mm, a design thickness of 2 mm and a thickness fluctuation of 23% (measured in accordance with the measurement method of the thickness fluctuation of the base lithium strip), and other parameters were shown in Table 1. The Mohs hardness of the lithium sheet used to prepare the lithium strip with a wide width was 0.6.

Comparative Example 2

Different from Example 1, the width of the base lithium strip was 180 mm, the thickness fluctuation in the transverse direction (TD) was 5.5%, and the other parameters were shown in Table 1.

Comparative Example 3

Different from Example 3, the thickness fluctuation of the base lithium strip was 10%, and the other parameters were shown in Table 1.

Test Section (1) Width of base lithium strip (soft ruler, with an accuracy of 0.1 mm)
(2) Thickness (micrometer, with an accuracy of 0.001 mm)
(3) Hardness of base lithium strip (Mohs hardness tester)
(4) Width of the body region of the spliced area (soft ruler, with an accuracy of 0.1 mm)
(5) Width of spliced lithium strip (soft ruler, with an accuracy of 0.1 mm)

TABLE 1

| No. | Base lithium strip | | | | Processing conditions | | Spliced lithium strip | | |
|---|---|---|---|---|---|---|---|---|---|
| | Width (mm) | Design thickness (mm) | thickness fluctuation A (%) | Mohs hardness | Width of stack (mm) | Rolling pressure (ton) | Width (mm) | θ (°) | Thickness deviation B (%) |
| Example 1 | 80 | 2 | 1.0 | 0.6 | 1 | 1.5 | 159 | $8 \times 10^{-4}$ | 2.0 |
| Example 2 | 100 | 2 | 1.3 | 0.6 | 1 | 1.5 | 199 | $8 \times 10^{-4}$ | 2.3 |
| Example 3 | 130 | 2 | 1.5 | 0.6 | 1 | 1.5 | 259 | $8 \times 10^{-4}$ | 2.5 |
| Example 4 | 140 | 2 | 2.0 | 0.6 | 1 | 1.5 | 279 | $8 \times 10^{-4}$ | 3.0 |
| Example 5 | 160 | 2 | 3.0 | 0.6 | 1 | 1.5 | 319 | $8 \times 10^{-4}$ | 4.0 |
| Example 6 | 170 | 2 | 5.0 | 0.6 | 1 | 1.5 | 339 | $8 \times 10^{-4}$ | 6.0 |
| Example 7 | 130 | 2 | 1.5 | 0.8 | 1 | 1.5 | 259 | $1.15 \times 10^{-3}$ | 2.7 |
| Example 8 | 130 | 2 | 1.5 | 1.0 | 1 | 1.5 | 259 | $1.57 \times 10^{-3}$ | 2.9 |
| Example 9 | 130 | 2 | 1.5 | 1.2 | 1 | 1.5 | 259 | $1.71 \times 10^{-3}$ | 3.1 |
| Example 10 | 130 | 2 | 1.5 | 2 | 1 | 1.5 | 259 | $1.8 \times 10^{-3}$ | 4.5 |
| Example 11 | 130 | 2 | 1.5 | 2.5 | 1 | 1.5 | 259 | 0.0162 | 6.0 |
| Example 12 | 130 | 2 | 1.5 | 0.6 | 0.1 | 1.5 | 259.9 | $3.2 \times 10^{-4}$ | 1.7 |
| Example 13 | 130 | 2 | 1.5 | 0.6 | 2 | 1.5 | 258 | $9 \times 10^{-4}$ | 3.0 |
| Example 14 | 130 | 2 | 1.5 | 0.6 | 3 | 1.5 | 257 | $1.67 \times 10^{-3}$ | 4.0 |
| Example 15 | 130 | 2 | 1.5 | 0.6 | 3.5 | 1.5 | 256.5 | $1.54 \times 10^{-3}$ | 6.0 |
| Example 16 | 130 | 0.2 | 3.0 | 0.6 | 1 | 1.5 | 259 | $1.8 \times 10^{-4}$ | 4.5 |
| Example 17 | 130 | 0.5 | 2.5 | 0.6 | 1 | 1.5 | 259 | $4.5 \times 10^{-4}$ | 4.0 |
| Example 18 | 130 | 1 | 1.7 | 0.6 | 1 | 1.5 | 259 | $6.8 \times 10^{-4}$ | 3.0 |
| Example 19 | 130 | 3 | 1.3 | 0.6 | 1 | 1.5 | 259 | $1.85 \times 10^{-3}$ | 3.5 |
| Example 20 | 130 | 4 | 1.1 | 0.6 | 1 | 1.5 | 259 | $1.94 \times 10^{-3}$ | 4.5 |
| Example 21 | 130 | 2 | 1.5 | 0.6 | 1 | 0.9 | 259 | $2 \times 10^{-3}$ | 5.9 |
| Comparative Example 1 | A 259 mm wide lithium strip formed by one-time molding, the thickness fluctuation of the lithium strip was 23% | | | | | | | | |
| Comparative Example 2 | 180 | 2 | 5.5 | 0.6 | 1 | 1.5 | 359 | $8 \times 10^{-3}$ | 6.5 |
| Comparative Example 3 | 130 | 2 | 10 | 0.6 | 1 | 1.5 | 259 | $3.2 \times 10^{-3}$ | 12.0 |

In Table 1, the overall thickness fluctuation of the spliced lithium strip in Examples 1-21 and Comparative Examples 2-3 was equal to the thickness deviation B.

It can be seen from the comparison between Examples 1-21 and Comparative Examples 1-3 that, the present application adopted the method of splicing base lithium strip, and controlled the thickness fluctuation A of the base lithium strip and the thickness deviation B of the spliced area and the non-spliced area within a specific range. The resulting spliced lithium strip can simultaneously have a larger width and good thickness uniformity.

Figure 2:
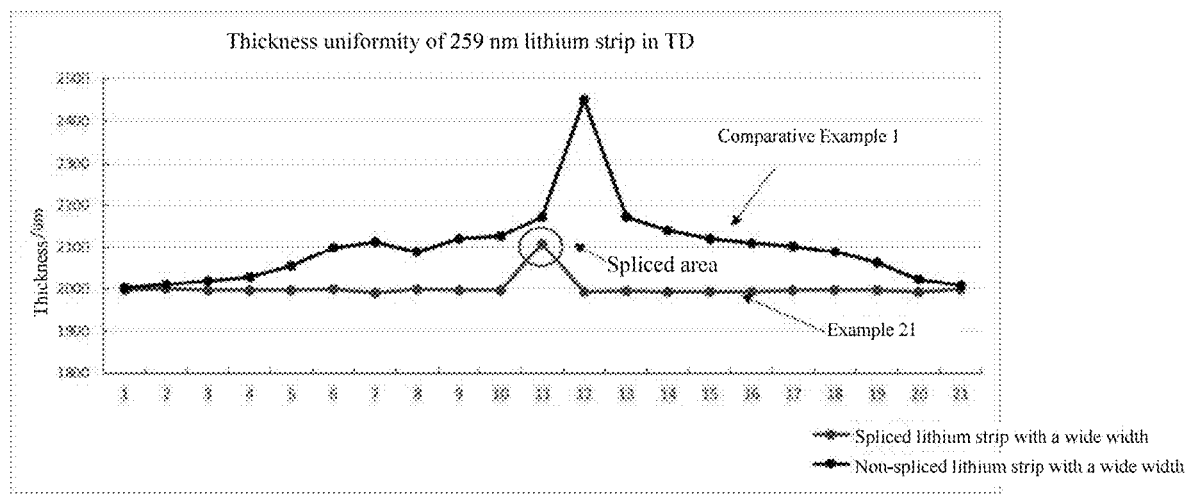
FIG. 2 is a graph showing the thickness change of the spliced lithium strip of Example 21 and the wide lithium strip of Comparative Example 1.

However, in Comparative Example 1, a wide-width lithium strip was directly formed and processed by one-time molding, and the thickness of the wide-width lithium strip was greatly fluctuated, and the thickness uniformity was poor (as shown in FIG. 2). The thickness of the base lithium strip of Comparative Examples 2 and 3 fluctuated greatly, which also caused the thickness uniformity of the spliced wide-width lithium strip to deteriorate.

From the results of Examples 1-6 and Comparative Example 2, it can be seen that when the width of the base lithium strip was 170 mm or less, the thickness fluctuation was usually small, which can improve the thickness uniformity of the spliced lithium strip.

It can be seen from the results of Examples 3 and 7 to 11 that when the hardness of the base lithium strip was 0.6 to 2.5, it was beneficial to improving the thickness uniformity of the spliced lithium strip.

From the results of Examples 3 and 12-15, it can be seen that when the overlapped width of the base lithium strips was 3.5 mm or less, the thickness uniformity of the spliced lithium strip can be improved.

From the results of Examples 3 and 16-20, it can be seen that the thickness of the base lithium strip will affect its own thickness fluctuations, which in turn will affect the thickness uniformity of the spliced lithium strip. When the thickness of the base lithium strip was less than 4 mm and the thickness fluctuation was less than 5%, it was beneficial to improving the thickness uniformity of the spliced lithium strip.

From the results of Example 3 and Example 21, it can be seen that the rolling pressure of the spliced basic lithium strip will affect the thickness uniformity of the spliced lithium strip. The rolling pressure in Example 21 was relatively small, resulting in a large thickness of the spliced area, and the thickness uniformity of the obtained spliced lithium strip was relatively reduced.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A spliced lithium strip formed by splicing two or more base lithium strips, wherein
the base lithium strip has a thickness fluctuation of less than 5%;
the spliced lithium strip has a spliced area and a non-spliced area alternately distributed along the splicing direction, and the spliced area has a maximum thickness H and the non-spliced area has a minimum thickness L, satisfying $$\frac{|H-L|}{L} \times 100\% \le 6\%.$$

2. The spliced lithium strip according to claim 1, wherein the spliced area comprises a body region and a transition region, and the transition region of each spliced area is adjacent to the non-spliced area, and each body region has a width of 0.1 mm to 3 0.5 mm, optionally 1 mm to 3 mm.

3. The spliced lithium strip according to claim 1, wherein the spliced area comprises two protrusions opposite to each other along the thickness direction of the spliced lithium strip, and the two protrusions respectively protrude from the two surfaces of the non-spliced area in the thickness direction, and each of the protrusions in the thickness direction has a cross section in a trapezoidal or trapezoid-like shape, and each trapezoid or trapezoid shape has a lower bottom angle of 0.02 degree or less, optionally $2\times10^{-3}$ degree or less, or $1\times10^{-4}$ degree to $2\times10^{-3}$ degrees.

4. The spliced lithium strip according to any one of claim 1, wherein the thickness fluctuation of the base lithium strip is 3% or less, optionally 2.5% or less.

5. The spliced lithium strip according to any one of claim 1, wherein the maximum thickness H of the spliced area and the minimum thickness L of the non-spliced area satisfy $$\frac{|H-L|}{L} \times 100\% \le 5\%.$$

6. The spliced lithium strip according to any one of claim 1, wherein the width of the base lithium strip is 170 mm or less, optionally 80 mm to 160 mm, or 80 mm to 130 mm.

7. The spaced lithium strip according to any one of claim 1, wherein the thickness of the base lithium strip is (12 mm to 4 mm, optionally 0.5 mm to 3 mm, or 1 mm to 2 mm.

8. The spliced lithium strip according to any one of claim 1, wherein the base lithium strip has a Mohs hardness of 0.6 to 2.5, optionally 0.6 to 2.0, 0.6 to 1.5, or 0.6 to 1.0.

9. The spliced lithium strip according to claim 2, wherein the spliced lithium strip is formed by splicing two or more base lithium strips in the width direction thereof, and the spliced area and the non-spliced area are alternately distributed in the width direction of the spliced lithium strip.

10. The spliced lithium strip according to claim 9, wherein, relative to a side edge in the width direction of the spliced lithium strip itself, the position of the body region in the width direction fluctuates within 1 mm.

11. A method for preparing a spliced lithium strip, including:
providing two or more base lithium strips, each of which has a thickness fluctuation of less than 5%;
splicing the two or more base lithium strips one by one, so that the edges of two adjacent base lithium strips are overlapped with each other, and pressing together to obtain the spliced lithium strip;
wherein, the spliced lithium strip has a spliced area and a non-spliced area alternately distributed along the splicing direction, and the spliced area has a maximum thickness H and the non-spliced area has a minimum thickness L, satisfying $$\frac{|H-L|}{L} \times 100\% \le 6\%.$$

12. The method according to claim 11, wherein
the two or more base lithium strips are sequentially spliced along their own width direction, and edges of the two adjacent base lithium strips that are overlapped with each other has a width of 0.1 mm to 3.5 mm;
before the pressing together, the method further includes correcting the deviation of the two or more spliced base lithium strips, taking the outer edge of the outermost base lithium strip as a reference, the overlapped area where the edges of the two adjacent base lithium strips are stacked on each other has a position fluctuation in the width direction within 1 mm.

13. A negative electrode plate, comprising: a negative current collector; a negative active material layer disposed on the negative electrode current collector; a lithium-based metal layer disposed on the negative active material layer, wherein the lithium-based metal layer is formed by laminating the spliced lithium strip according to claim 1.

14. A battery core comprising the negative electrode plate according to claim 13.

15. A lithium ion battery comprising the battery core according to claim 14 and an electrolyte.

16. A battery module comprising the lithium ion battery according to claim 15.

17. A battery pack comprising the battery module according to claim 16.

18. An apparatus comprising at least one of the lithium ion battery according to claim 15.

* * * * *